United States Patent
Wang et al.

(10) Patent No.: US 11,645,111 B2
(45) Date of Patent: May 9, 2023

(54) MANAGING TASK FLOW IN EDGE COMPUTING ENVIRONMENT

(71) Applicant: INTERNATIONAL BUSINESS MACHINES CORPORATION, Armonk, NY (US)

(72) Inventors: Yue Wang, Beijing (CN); Xin Peng Liu, Beijing (CN); Liang Wang, Beijing (CN); Zheng Li, Beijing (CN); Wei Wu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 17/078,617

(22) Filed: Oct. 23, 2020

(65) Prior Publication Data
US 2022/0129306 A1    Apr. 28, 2022

(51) Int. Cl.
G06F 9/46     (2006.01)
G06F 9/48     (2006.01)
G06F 9/50     (2006.01)

(52) U.S. Cl.
CPC .......... G06F 9/4881 (2013.01); G06F 9/5083 (2013.01)

(58) Field of Classification Search
CPC .............................. G06F 9/4881; G06F 9/5083
See application file for complete search history.

(56) References Cited

U.S. PATENT DOCUMENTS

| | | | |
|---|---|---|---|
| 9,485,197 B2 | 11/2016 | Dutta | |
| 2005/0283786 A1* | 12/2005 | Dettinger | G06Q 10/10 718/104 |
| 2012/0166514 A1 | 6/2012 | Mathew | |
| 2015/0071851 A1 | 1/2015 | Swarnava | |
| 2016/0036886 A1* | 2/2016 | Ito | H04N 21/23439 709/219 |
| 2016/0140359 A1* | 5/2016 | Mukherjee | H04L 67/10 726/26 |

(Continued)

FOREIGN PATENT DOCUMENTS

| | | |
|---|---|---|
| CN | 109918205 A | 6/2019 |
| CN | 110557419 A | 12/2019 |
| EP | 3699825 A2 | 8/2020 |

OTHER PUBLICATIONS

Amazon Web Services, "AWS Industrial IoT Asset Condition Monitoring Reference Architecture," 2019, 1 page, https://d1.awsstatic.com/IoT/AWS%20Industrial%20-%20Asset%20Condition%20Monitoring%20Reference%20Architecture.pdf.

(Continued)

*Primary Examiner* — Camquy Truong
(74) *Attorney, Agent, or Firm* — Robert R. Aragona

(57) ABSTRACT

The present disclosure provides a computer-implemented method, computer system and computer program product for managing a task flow. According to the computer-implemented method, a definer module may receive a request for executing a task flow. The definer module may determine a cluster of edge devices to execute the task flow from a set of edge devices. The definer module may retrieve metadata information for the task flow and edge devices in the cluster, wherein the metadata information is used to schedule the task flow in the cluster. Then the edge devices in the cluster may execute the task flow according to the metadata information.

11 Claims, 8 Drawing Sheets

(56) References Cited

U.S. PATENT DOCUMENTS

2016/0292006 A1* 10/2016 Takeuchi .............. G06F 9/4843
2018/0109610 A1    4/2018 Einkauf
2018/0131770 A1    5/2018 Doraiswamy
2019/0391855 A1   12/2019 Bernat
2020/0136920 A1*  4/2020 Doshi .................... H04L 67/10

OTHER PUBLICATIONS

KubeEdge, "Welcome to KubeEdge A Kubernetes Native Edge Computing Framework," https://kubeedge.io/en/, Accessed Jul. 28, 2020, 4 pages.

Mell et al., "The NIST Definition of Cloud Computing", National Institute of Standards and Technology, Special Publication 800-145, Sep. 2011, 7 pages.

Tencent, "IoT Edge Computing Platform IECP," accessed Jul. 29, 2020, https://cloud.tencent.com/product/iecp, 7 pages.

* cited by examiner

| SubTask ID | Tag |
|---|---|
| SubTask_1_1 | Tag_1 |
| SubTask_1_2 | Tag_1 |
| SubTask_2 | Tag_2 |

| Device ID | Tag | CPU Usage |
|---|---|---|
| C | Tag_1 | 50% |
| B | Tag_1 | 20% |
| A | Tag_2 | 30% |

| Device ID | SubTask ID | Task ID | Cluster ID | Next SubTask | Next Device ID | Is_coordinator |
|---|---|---|---|---|---|---|
| B | SubTask_1_1 | Task_1 | Cluster_1 | SubTask_2 | A | Yes |
| C | SubTask_1_2 | Task_1 | Cluster_1 | SubTask_2 | A | No |
| A | SubTask_2 | Task_1 | Cluster_1 | End | N/A | No |

MANAGING TASK FLOW IN EDGE COMPUTING ENVIRONMENT

BACKGROUND

The present disclosure generally relates to computer techniques and more particularly, to a method, system, and computer program product for dynamically managing task flow in an edge computing environment.

With the development of cloud computing and IoT technologies, edge computing becomes a new emerging direction to achieve stronger computation capabilities. In the context of Internet of Things (IoT), "edge" or "edge system" refers to computing infrastructure that exists close to sources of data. Such computing infrastructure may include, for example, industrial machines, industrial controllers, industrial sensors, mobile devices, and/or any other infrastructure one of ordinary skill in the art would recognize may exist close to the sources of data. The machines and/or devices as the sources of data may be referred as "edge devices." The edge devices typically reside away from a centralized computing resource available in a cloud. The edge system may move at least one of applications, data processing, and models away from the centralized cloud data centers to an edge side closer to the edge devices, thereby reducing the amount of data traffic to the cloud data centers.

SUMMARY

According to one embodiment of the present disclosure, there is provided a computer-implemented method, computer system, and computer program product for managing a task flow. According to the computer-implemented method, a definer module may receive a request for executing a task flow. The definer module may determine a cluster of edge devices to execute the task flow from a set of edge devices. The definer module may retrieve metadata information for the task flow and the edge devices in the cluster, wherein the metadata information is used to schedule the task flow in the cluster. Then the edge devices in the cluster may execute the task flow according to the metadata information.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
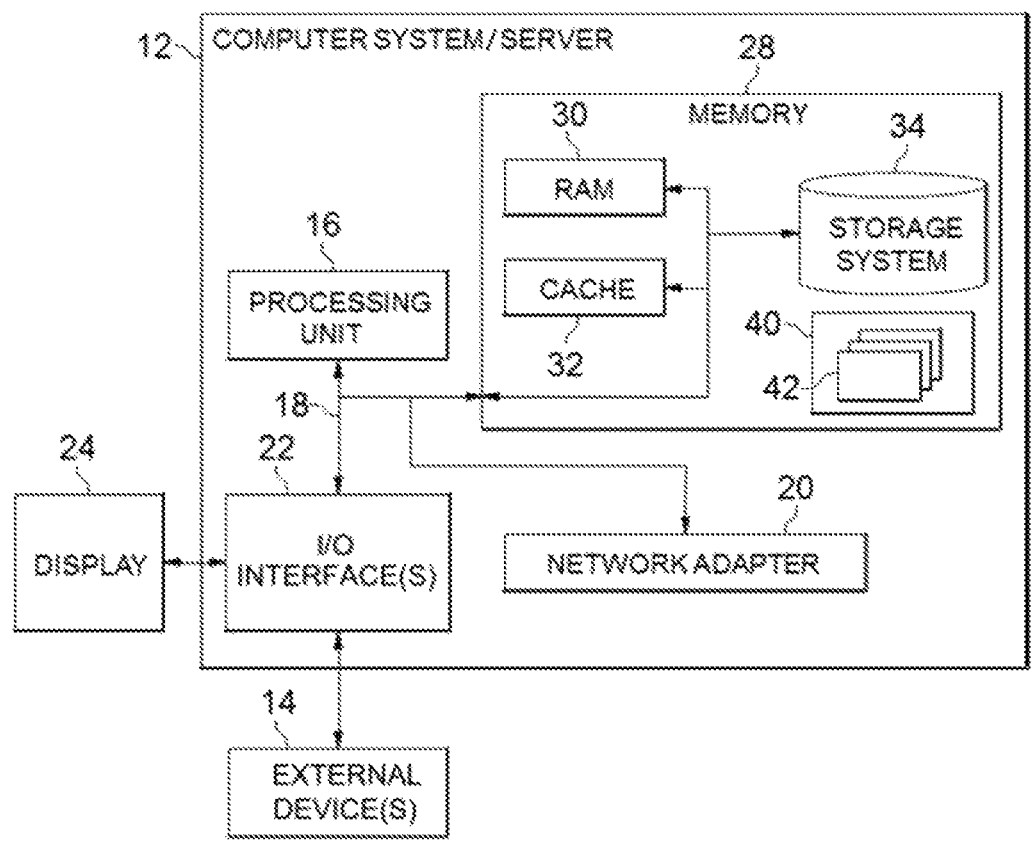
FIG. 1 depicts a schematic of an example of a computer system/server according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a computer system/server 12 is shown, which in some embodiments can be a portable electronic device such as a communication device, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, and so on that perform particular tasks or implement particular data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system/server 12 is shown in the form of a general-purpose computing device. The components of the computer system/server 12 may include, but are not limited to, one or more processors or processing units 16, a system memory 28, and a bus 18 that couple various system components including the system memory 28 to the one or more processors or processing units 16.

The bus 18 may represent one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 may typically include a variety of computer system readable media. Such media may be any available media that is accessible by the computer system/server 12, and the media includes both volatile and non-volatile media, as well as removable and non-removable media.

The system memory 28 can include computer system readable media in the form of volatile memory, such as random access memory (RAM) 30 and/or cache memory 32. The computer system/server 12 may further include other removable/non-removable, and/or volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the present disclosure.

A program/utility 40, having one or more program modules 42, may be stored, for example, in the system memory 28 as well as in an operating system, one or more application programs, other program modules, and program data. Each of the operating system, one or more application programs, other program modules, and program data or some combination thereof may include an implementation of a networking environment. The one or more program modules 42 may generally carry out the functions and/or methodologies of embodiments of the present disclosure as described herein. The computer system/server 12 may also communicate with one or more external devices 14 such as a keyboard, a pointing device, a display 24, one or more devices that enable a user to interact with computer system/server 12, and/or any devices (e.g., network card, modem, etc.) that enable the computer system/server 12 to communicate with one or more other computing devices. Such communication can occur via Input/Output (I/O) interfaces 22. Still yet, the computer system/server 12 can communicate with one or more networks such as a local area network (LAN), a general wide area network (WAN), and/or a public network (e.g., the Internet) via a network adapter 20. As depicted, the network adapter 20 may communicate with the other components of the computer system/server 12 via the bus 18. It should be understood that although not shown, other hardware and/or software components could be used in conjunction with the computer system/server 12. Examples include, but are not limited to, microcode, device drivers, redundant processing units, external disk drive arrays, RAID systems, tape drives, and data archival storage systems. The computer system/server 12 shown in FIG. 1 may be a cloud computing node, such as one or more cloud computing nodes 10 shown in FIG. 2. The computer system/server 12 shown in FIG. 1 may also be hardware components in the exemplary edge computing environment, shown in FIG. 4 and FIG. 5, in accordance with at least one illustrative embodiment of the present disclosure.

Figure 2:
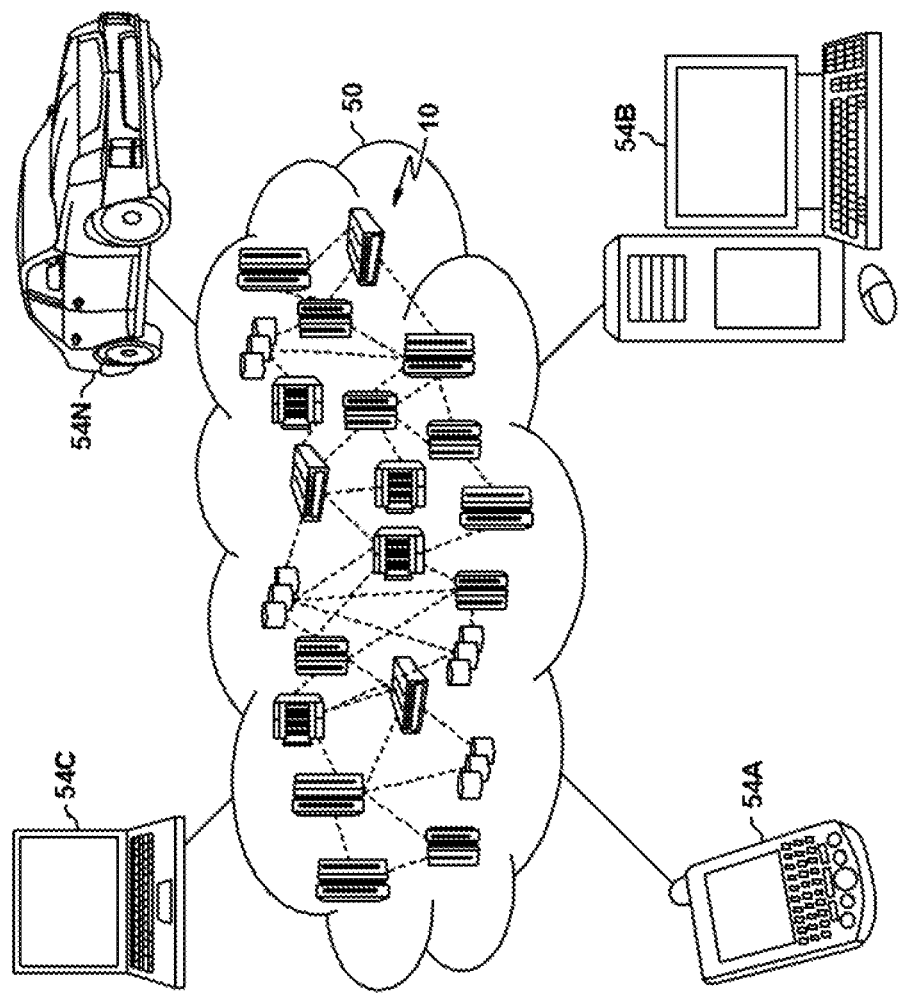
FIG. 2 depicts a cloud computing environment according to an embodiment of the present disclosure.

Referring now to FIG. 2, an illustrative cloud computing environment 50 is depicted. As shown, the cloud computing environment 50 may include the one or more cloud computing nodes 10 with which local computing devices used by cloud consumers, such as, for example, a personal digital assistant (PDA) or cellular telephone 54A, a desktop computer 54B, a laptop computer 54C, and/or an automobile computer system 54N may communicate. The one or more nodes 10 may communicate with one another. They may be grouped (not shown) physically or virtually, in one or more networks, such as Private, Community, Public, or Hybrid clouds as described hereinabove, or a combination thereof. This grouping may allow the cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that the one or more computing nodes 10 and the cloud computing environment 50 can communicate with any type of computerized device over any type of network and/or network addressable connection (e.g., using a web browser).

Figure 3:
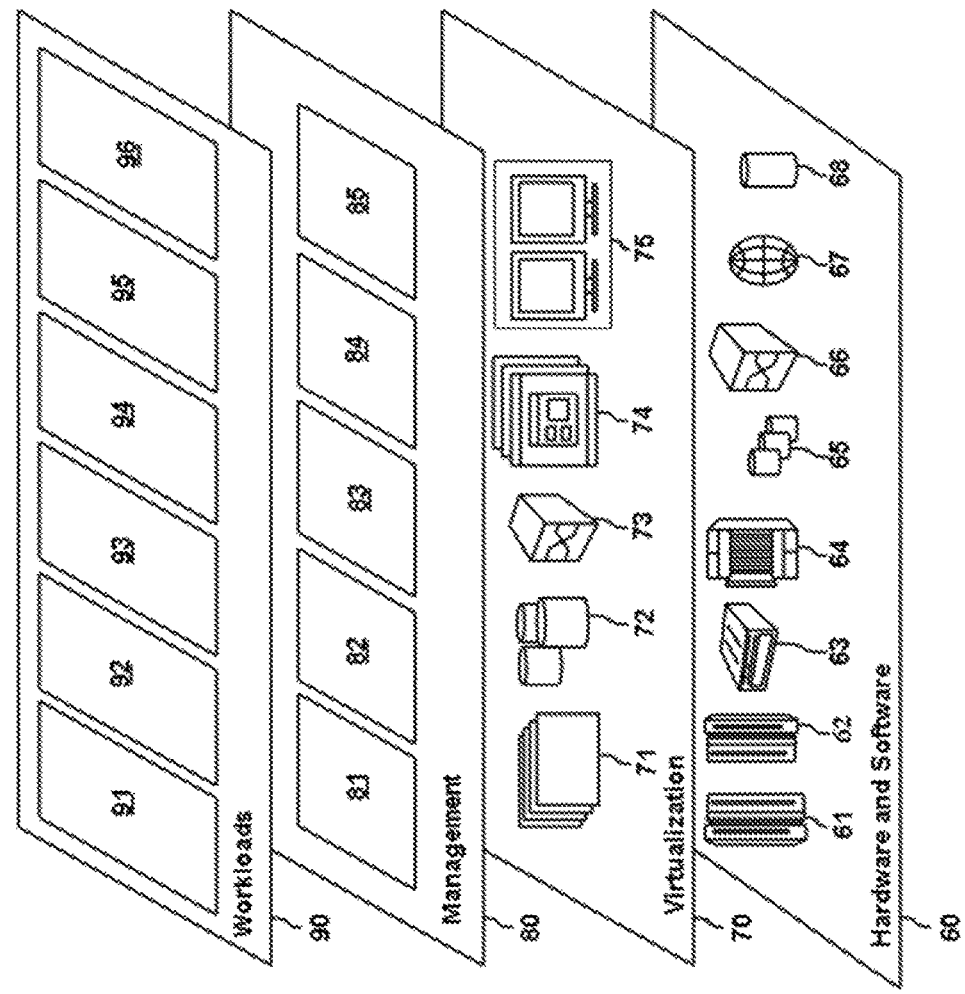
FIG. 3 depicts abstraction model layers according to an embodiment of the present disclosure.

Referring now to FIG. 3, a set of functional abstraction layers 300 provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

A workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an edge controller 96.

The functional abstraction layers in FIG. 3 are only for example. When necessary, one or more layers can be added thereto, and one or more layers in FIG. 3 can be merged or omitted. In addition, in each layer of FIG. 3, some components can be omitted or merged, and one or more components can be added.

Example Computing Environment

As mentioned above, with the development of cloud computing and IoT technologies, edge computing becomes a new emerging direction to achieve stronger computation capabilities. Edge computing is rapidly becoming a key part of the Industrial Internet of Things (IIoT) to accelerate digital transformation. Edge computing is focused on the devices and technology that are actually attached to the 'thing', such as industrial machines. Intelligent manufacture may be a typical example of edge computing. Edge computing may enable analytics and data gathering to occur at the source of the data.

It can be understood that edge computing may be an optimization to cloud computing systems and may work together with cloud computing. Scenarios in which edge computing may dominate include a need for low latency or where there are bandwidth constraints. Edge computing may also be important when Internet or cellular connections are spotty. Cloud computing may take a more dominant position when actions require significant computing power to effectively manage vast data volumes from machines. Cloud computing and edge computing may both be necessary to industrial operations to gain the most value from today's sophisticated, varied, and large volumes of data. It may be advantageous for industrial or server providers to manage and process data from edge devices at the edge side closer to the edge devices, in the cloud or a combination of the two, to achieve optimal operation.

Figure 4:
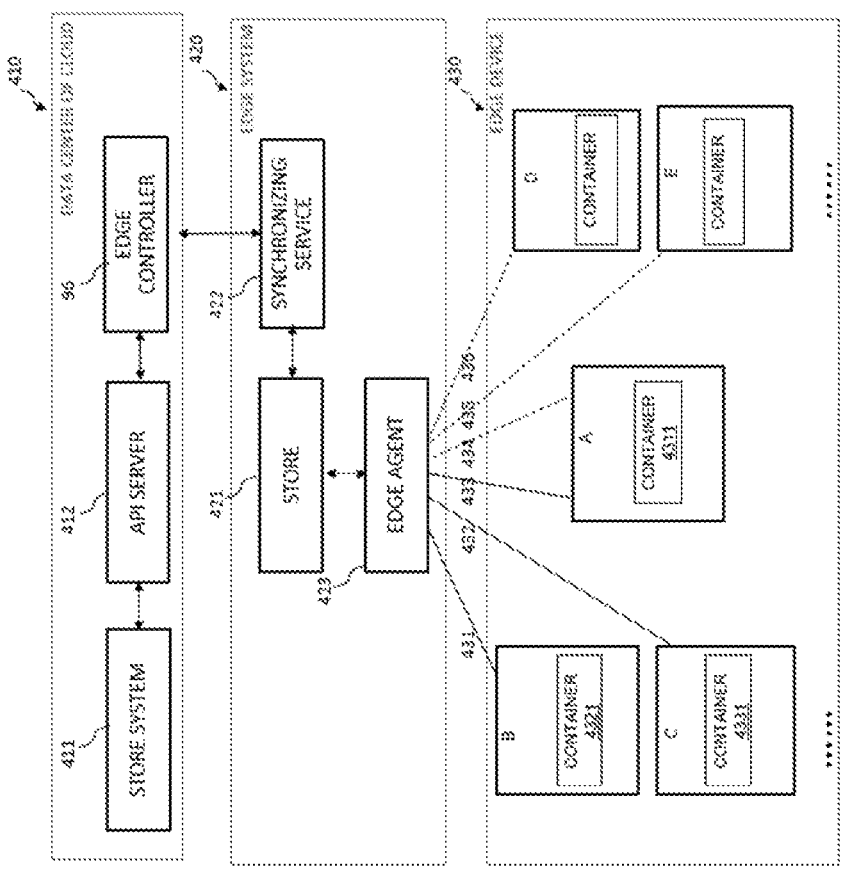
FIG. 4 illustrates an existing exemplary edge computing environment.

FIG. 4 illustrates an existing exemplary edge computing environment. The existing exemplary edge computing environment may contain components and/or modules running both at a cloud layer and an edge layer. It can be understood that in the existing exemplary edge computing environment, a data center of the cloud may be connected with the edge system and the edge devices, rather than connected with computing nodes/severs in the typical cloud computing environment.

As shown in FIG. 4, the exemplary edge computing environment may comprise the data center of the cloud layer 410, the edge system layer 420, and the edge devices layer 430. The hardware components in each layer in the exemplary edge computing environment may be the computer system/server 12 shown in FIG. 1. The computer system/server 12 shown in FIG. 1 may be capable of implementing any of the functionality in the exemplary edge computing environment. All components and/or modules in the exemplary edge computing environment may be connected directly or indirectly via a communication network. The network in FIG. 4 may include various types of communication networks, such as a wide area network (WAN), a local area network (LAN), a telecommunication network, a wireless network, a public switched network and/or a satellite network. The communication network may include connections, such as wire, wireless communication links, fiber optic cables, and/or any other connection one of ordinary skill in the art would recognize may allow for access to the communication network.

It would be appreciated that the layers and modules across the edge computing environment and the number of edge devices are provided for the purpose of illustration only. The edge computing environment may comprise one or more other layers and modules, and the number of edge devices may be different and arranged in other manners.

The data center of the cloud layer 410 may belong to the existing cloud computing environment, which has been described with reference to FIG. 2-3 above. In practice, according to actual requirements and conditions of production or service, the cloud computing center 410 may send parts of computing power, such as parts of models and applications, to the edge system 420 to execute a central management of the edge devices.

As shown in FIG. 4, the exemplary modules in the data center of the cloud layer 410 may comprise a store system 411, an API sever 412 and the edge controller 96. The store system 411 may store metadata needed by the API sever 412. For example, the store system 411 may be a consistent, distributed key-value store. The stored data in the store system 411 may be accessed by a distributed system or cluster of machines. The API sever 412 may be used for processing API operations and may be invoked by users. The components in the cloud layer 410 may rely on the API server 412 for message delivery. The edge controller 96 may be used to communicate between the data center of the cloud layer 410 and the edge system layer 420 to execute the central management.

The edge system layer 420 may manage the edge devices in the edge devices layer 430. Taking intelligent production as an example, a central management system of a production line in the industrial park of the intelligent production may be referred to as an edge system, and the machines of the production line in the industrial park may be referred to as edge devices. Taking a base station as another example, the central management system of the base station may be referred to as the edge system, and the mobile devices communicating with the base station may be referred to as edge devices.

As shown in FIG. 4, the exemplary modules in the edge system layer 420 may comprise a store module 421, a synchronizing service module 422 and an edge agent module 423. The store module 421 may store metadata for the edge system 420 and the edge devices. The synchronizing service module 422 may be the central data processing module of the edge system 420 and may be used to synchronize the model and data between the cloud 410 and the edge system 420, and the edge agent module 423 may be the management module of the edge devices.

The "edge device" may be defined as an entry point into enterprise or service provider's core networks. The edge system 420 may process data of the edge devices, and may send only the data that has been processed, or is suitable for central processing, over the network to the cloud data center 410. In this manner, massive data transmission of unprocessed data over the network may be avoided and the time for central processing may be saved. As shown in FIG. 4, the exemplary edge devices layer 430 may comprise a plurality of edge devices, such as devices A, B, C, D and E, etc. Each of the edge devices may comprise a container, such as the containers 4321, 4331, 4311 in devices B, C, and A respectively. The container may be a service grid or module configured to execute requests of tasks.

It can be understood that industrial/intelligent production or service functions can be carried out or realized in the edge computing environment. The edge devices may be requested to perform various tasks to fulfil a workload, either to accomplish production missions or to implement service functions. The tasks may comprise a series of subtasks. The subtasks may be executed on multiple devices in parallel and/or in series. The task may also be referred to as the "task flow" herein. A process of production or service may be a process of executing the task flow, including a series of subtasks executed on the edge devices.

It can also be understood that in actual production or service practice, multiple task flows can be run in parallel. For each task flow, a plurality of devices may be involved. Supposing there are two similar task flows to be executed in the edge devices in parallel, one of the task flows may comprise a series of subtasks which are to be run on devices B, C, and A. The devices B, C, and A may respectively receive the assigned subtask from the edge agent 423 and turn back the running result to the edge agent 423 respectively as shown by lines 431, 432 and 433. The other task flow may comprise a series of subtasks which are to be run on devices D, E, and A. Similarly, devices D, E, and A may communicate with the edge agent 423 to execute the task flow as shown by dotted lines 434, 435 and 436.

It can be noted that each of the edge devices involved in the task flow may be required to communicate with the edge agent 423 to complete the task flow. The edge agent 423 may be required to send the task request to each of the edge devices and receive the running result from each device. Stated differently, each of the edge devices may receive a task request from the edge agent 423 and may output the running result to the edge agent 423. As can be seen, the edge agent 423 in the edge system layer 420 may control the execution of all the task flows.

In actual production or service practice, the tasks to be executed may be massive and complex, and the number of edge devices involved may be large. However, in the existing edge computing environment, the management to the task flows may mainly focus on the edge agent 423 system as mentioned above. The edge agent's 423 workload may be very heavy and may result in the bottleneck of management. At the same time, the wired or wireless connections for communication between the edge agent 423 and the edge devices may be unstable, which may increase the risk of forming a bottleneck of management, or a system failure.

Embodiments of the present disclosure aim to solve the problem described above, and propose a solution for dynamically managing the task flow mainly in the edge device layer 430 instead of in the edge system layer 420 to reduce the workload of the edge agent 423.

In the following, embodiments of the present disclosure will be described in detail with reference to FIGS. 5 to 8.

Figure 5:
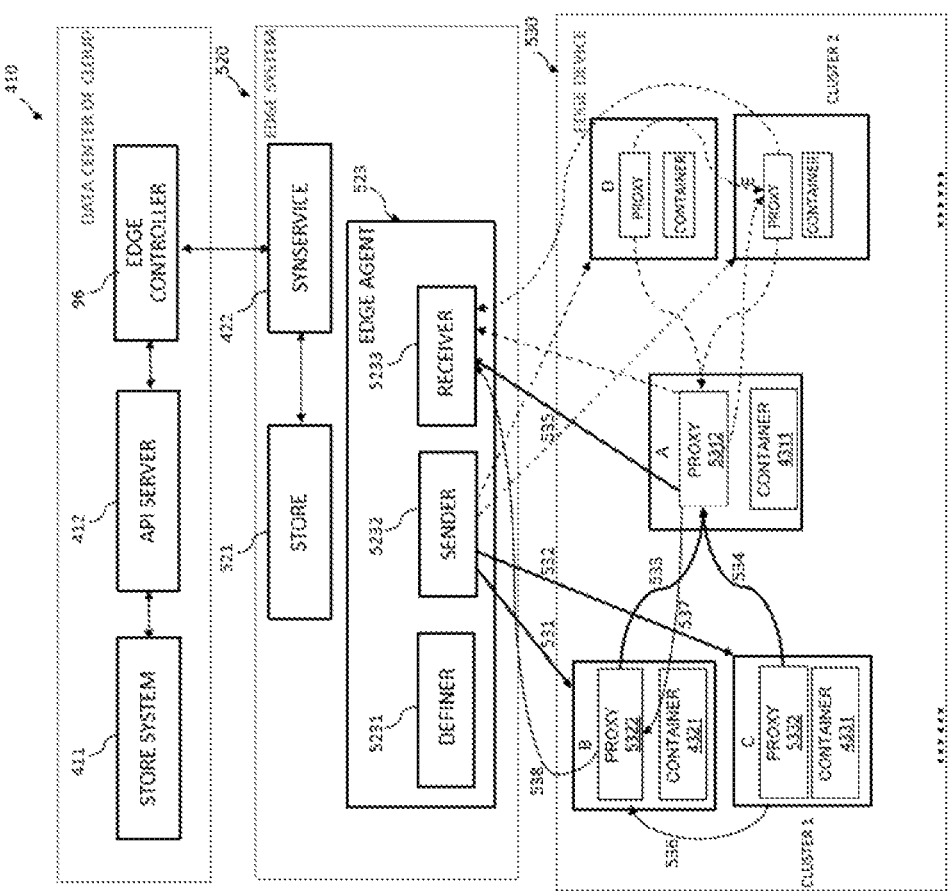
FIG. 5 illustrates an exemplary edge computing environment in accordance with some embodiments of the present disclosure.

FIG. 5 illustrates an exemplary edge computing environment in accordance with embodiments of the present disclosure. It should be noted that similar and corresponding modules or elements in FIG. 4 are referred to by similar reference numerals in FIG. 5 and will not be discussed herein.

It should be appreciated that FIG. 5 provides only an illustration of implementation of the edge computing environment and does not imply any limitations regarding the environments in which different embodiments may be implemented. Many modifications to the illustration environment may be made.

Now referring to FIG. 5, a definer module 5231, a sender module 5232 and a receiver module 5233 may be configured in the edge agent 523. Compared with the existing computing environment shown in FIG. 4, these modules have improved functions, which will be discussed in detail in the following. Additionally, one or more proxy modules, such as proxy 5312 and proxy 5322, may be configured in each of the edge devices. For example, the proxy module 5312 may be configured in device A, the proxy module 5322 may be configured in device B and so on. According to an embodiment of the present disclosure, the definer module 5231, the sender module 5232, and the receiver module 5233, as well as the one or more proxy modules may be used to manage and control the task flows. It would be appreciated that the modules are provided for the purpose of illustration only. The edge computing environment in accordance with some embodiments of the present disclosure may comprise additional or fewer modules to achieve a similar function or intention. The modules as well as the number of them may be different and arranged in other manners.

In the existing edge computing environment, the edge agent 423 may be configured to determine the edge devices for executing the task flow dynamically or in real time. According to an embodiment of the present disclosure, the definer module 5231 may be configured to determine the edge devices for execution of the task flow dynamically. The edge devices for executing the task flow may form a cluster, such as cluster 1 and cluster 2. For example, if the definer module 5231 determines that one task flow may be executed on the devices B, C, and A, the group of devices B, C, and A may be referred to as cluster 1 as shown in FIG. 5.

Similarly, the definer module 5231 may determine the other task flow may be executed on the devices D, E and A in parallel, and the group of devices D, E and A may be referred to as cluster 2, as shown in FIG. 5. For simplicity, only the task flow executed in cluster 1 will be discussed in detail in the following.

The definer module 5231 may be further configured to determine metadata information of cluster 1 to execute the task. The metadata information may be used to manage or schedule the task flow in the edge devices among cluster 1. The determination of metadata information will be described in detail in conjunction with FIG. 6 in the following.

According to an embodiment of the present disclosure, the sender module 5232 may be configured to send a request with the metadata information to one or more edge devices involved in cluster 1 to start the execution of the task. The metadata information may be sent together with the request. For example, as can be understood, a request may comprise a request header and a request body. The metadata information may be embedded in the header of the request. In this manner, the metadata information may be sent together with the request. The metadata information may also be sent separately. The manner of sending the metadata information should not adversely limit the scope of the disclosure.

The containers in each of the edge devices may run the assigned subtask and the one or more proxy modules in each of the devices may manage the data of task flow. The one or more proxy modules in each of the edge devices may manage or route the task flow according to the metadata information.

According to an embodiment of the present disclosure, the receiver module 5233 may be configured to receive a final running result/s from a corresponding last edge device/s in the cluster, rather than receiving a running result of each subtask from each device.

In this manner, the proposed solution of the present disclosure may enhance the existing edge computing architecture by allowing the task flow to be controlled in the edge device layer 530 rather than in the edge system layer 520. Thus the workload of management in the edge agent 523 and the risk of forming a bottleneck in the data center 410 may be reduced.

Figures 6A, 6B:
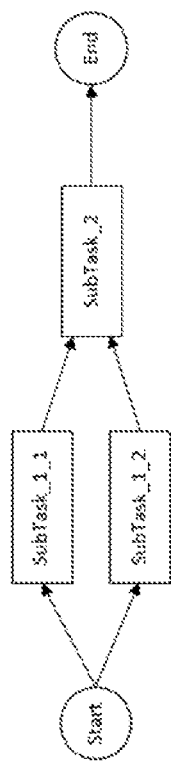
FIG. 6A illustrates an exemplary task flow in accordance with some embodiments of the present disclosure.
FIG. 6B illustrates information of the exemplary task flow in accordance with some embodiments of the present disclosure.

FIG. 6A illustrates an exemplary task flow in accordance with some embodiments of the present disclosure.

Referring now to FIG. 6A, the exemplary task flow may comprise two subtasks, subtask_1 (not shown) and subtask_2. The subtask_1 further comprises two subtasks, subtask_1_1 and subtask_1_2. The subtask_1_1 and subtask_1_2 may need to run on two devices in parallel. The running results of the two subtasks may need to be sent as the input to a third device to run the next subtask, namely, the subtask_2. The third device, which may be the last device to execute the subtask, may output the running result of subtask_2. Then the task flow may end. The information of the exemplary task flow may be retrieved in a table shown in FIG. 6B.

As mentioned above, in actual production or service practice, the tasks to be executed may be massive and complex. The task flow shown in FIG. 6A is merely provided as a specific example for illustration and simplicity, which suggests no limitations to the present disclosure. Embodiments of the present disclosure can be applied to all kinds of task flows with the same, similar, or different definitions.

In the following, taking the task flow shown in FIG. 6A as an example, embodiments of the disclosure will be described in detail with reference to FIGS. 5 to 8.

Metadata Information Determination

As briefly mentioned above, the definer module 5231 may be configured to dynamically determine the cluster of the edge devices for execution of a task flow based on attributes of the task flow and the edge devices, and may create the metadata information for the task flow and the edge devices in the cluster.

Figures 7A, 7B, 7C, 7D:
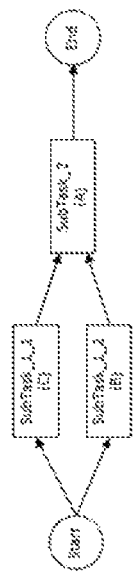
FIG. 7A illustrates the exemplary task flow with tags in accordance with some embodiments of the present disclosure.
FIG. 7B illustrates an exemplary cluster of edge devices with tags matching those of the task flow in accordance with some embodiments of the present disclosure.
FIG. 7C illustrates metadata information created for the cluster of edge devices for execution of the task flow in accordance with some embodiments of the present disclosure.
FIG. 7D illustrates the exemplary task flow with the metadata information in accordance with some embodiments of the present disclosure.

For example, upon receiving a task flow or task as shown in FIG. 6A, the definer module 5231 may obtain tags for each subtask of the task flow. The tags may indicate basic requirements for the attributes of the edge devices. In other words, the task flow may indicate which devices are adapted to execute the task in the tags. FIG. 7A illustrates an exemplary embodiment of the task flow with tags in accordance with some embodiments of the present disclosure.

It can be understood that the edge devices have their own attributes or characteristics and may be adapted to execute various tasks. The attributes of the edge devices may be properties, type, power, parameter, index, configuration and the like. For purpose of simplicity, the attributes of the devices may also be marked as tags. The definer module 5231 may determine the cluster of edge devices for execution of the task flow based on a mapping relationship of the tags between the task flow and the edge devices. Referring now to FIGS. 7A and 7B, subTask_1_1 may have a Tag_1, which may be mapped with that of device C; subTask_1_2 also may have a Tag_1, which may be mapped with that of device B; subTask_2 may have a Tag_2, which may be mapped with that of device A. The device C and device B may be the devices having the same attributes and may be interchangeable. Thus the definer module 5231 may determine devices A, B and C are adapted to execute the task flow.

According to embodiments of the present disclosure, the definer module 5231 may define the group of devices A, B and C as a cluster to execute the task flow, namely cluster 1, as shown in FIG. 5. Considering the instability of the network, the cluster may be dynamically determined among the available edge devices once the task flow is received. The cluster may be dissolved once the task flow is completed. It should be noted that the edge devices which are adapted to execute the task flow may also be determined in other appropriate approaches, such as based on historical data, custom, etc. The determination approach of the edge devices to execute the task flow should not adversely limit the scope of the disclosure.

According to embodiments of the present disclosure, the definer module 5231 may further retrieve metadata based on the mapping relationship between the task flow and the edge devices within the determined cluster as metadata information. Other information that can be used to manage or schedule the task flow may also be retrieved as metadata information. For example, in some embodiments of the present disclosure, a particular device of high performance may be selected from the cluster as a coordinator device to manage the edge devices in the cluster. Under this situation, the metadata information may comprise the corresponding information of the coordinator device.

Referring now to FIG. 7C, the device B may be marked as the coordinator device in the metadata information based on performance consideration. The device C and device A may not be the coordinator device. It can be understood that the performance of the device may be a comprehensive factor and, for simplicity, the performance may be represented by CPU usage as an example. As can be seen in FIG. 7B, the device B has the lowest CPU usage among the cluster, so device B may be selected as the coordinator device. The proxy of the coordinator device may regularly or irregularly obtain the status of other members in the cluster and may synchronize the status information to the edge system 520. In this manner, the edge system 520 may be informed if there is any exception, such as any device in the cluster failing due to an unstable network connection.

According to embodiments of the present disclosure, the metadata information may comprise any information that can be used to manage or schedule the task flow. For example, the metadata information may comprise at least one of the following: an ID of the task flow, an ID of the cluster, IDs of the edge devices involved in the cluster, IDs of the subtasks of the task flow to be executed by the edge devices in the cluster, and an ID of the coordinator edge device. The metadata information may be stored or maintained in the store module 521 in FIG. 5. The example metadata information for each device is shown in FIG. 7C. The metadata information in FIG. 7C is shown only for illustration and simplicity, which suggests no limitation to the present disclosure.

Referring now to FIG. 7D, each subtask of the task flow may be matched with a corresponding device among the cluster according to the metadata information. For example, the subtask_1_1 may match with device C, the subtask_1_2 may match with device B, and the subtask_2 may match with device A. That is, the device C may execute the subtask_1_1, the device B may execute the subtask_1_2, and the device A may execute the subtask_2. The device C and device B may be starting edge devices corresponding to starting subtasks, i.e., the subtask_1_1 and the subtask_1_2 respectively. The device A may be the last device corresponding to the last subtask, i.e., subtask_2. The running result of device A may be the final running result of the task flow. Thus, each device in the cluster may be matched with a corresponding subtask for running of the subtask according to the metadata information.

Process for Dynamically Managing Task Flow

According to embodiments of the present disclosure, the process of dynamically managing the task flow according to the metadata information may be described in conjunction with FIG. 5 and FIG. 6 in the following.

Referring now back to FIG. 5, upon the edge agent 523 receiving a request for executing a task flow as shown in FIG. 6A, the definer module 5231 may determine the cluster of edge devices which are adapted to execute the task flow based on the mapping relationship of the tags or the attributes between the edge devices available and the task. The definer module 5231 may further create the metadata information for the determined cluster of edge devices and the task flow, as shown in FIG. 7C.

Then the sender module 5232 may send the task request to device B and device C according to the metadata information as shown by lines 531 and 532. The sender module 5232 may also embed the metadata information in the header of the task request, so the metadata information may be sent to the edge devices together with the request. Once the request with the metadata information is received, the container 4321 in the device B and the container 4331 in device C may run the subtask_1_1 and subtask_1_2 respectively. Then the running result of the device B may be sent by the proxy 5322 in the device B to the device A, as shown by line 533. In parallel, the running result of the device C may be sent by the proxy 5332 in the device C to the device A according to the metadata information, as shown by line 534. The container 4311 in the device A may run the subtask_2 once receiving the running results both from the device B and the device C. The running result of the device A may be sent by the proxy 5312 in the device A to the receiver module 5233, as shown by line 535. Then the task flow may be completed. The lines 531-535 illustrate the process of executing the exemplary task flow in the cluster. If the coordinator device information is included in the metadata information, the process may further comprise a status flow in the cluster, which will be discussed in detail below.

According to embodiments of the present disclosure, the device B in the cluster may be selected as a coordinator device indicating the metadata information shown in FIG. 7C. The coordinator device B may obtain status information of the device C and the device A regularly or irregularly. The status information may comprise, but is not limited to, "running", "finish" and "failure". The status information may be obtained by asking or checking the device C and the device A by the coordinator device B. The device C and the device A may also report the status information of themselves to the coordinator device B. The obtaining of the status information may utilize any appropriate approach existing currently or developed in the future and should not adversely limit the scope of the invention.

Referring now back to FIG. 5, the proxy 5322 in the coordinator device B may obtain the status information of the device C and the device A, shown by lines 536 and 537 respectively. The proxy 5322 in the device B may send the received status information to the receiver module 5233, as shown by line 538. The lines 536-538 illustrate the status flow in the cluster. Thus, the status of the edge devices in the cluster may be managed by the coordinator device in the cluster and may be provided to the receiver module 5233. Upon obtaining the status information of "failure," the present cluster may be dissolved and a new cluster may be determined.

In this manner, the sender module 5232 may send the task request with the metadata information in the header to start the task flow. The receiver module 5233 may receive the final running result of the task flow from the corresponding last device and status information of the devices from the coordinator device of the cluster. The running result(s) other than the final running result(s) may not need to be transferred between the edge devices and the edge system 520. For example, the running result of the device C or the device B may not need to be sent to the receiver module 5233, but may be sent to the device A according to the metadata information. The running result of the device A may be the final running result, which may be sent to the receiver module 5233. Therefore, the management or schedule of the task flow may be realized according to the metadata information in the edge device layer 530, rather than in the edge system layer 520. The workload of the edge system layer 520 may therefore be reduced.

Similarly, the process of managing the task flow in the cluster 2 according to corresponding metadata information may be shown by the dotted lines in FIG. 5. As can be seen, for the task flow in the cluster 2, two subtasks of the task flow may be executed first in the device D and the device E in parallel, then the running result from the device D and the device E may be executed on the device A. The coordinator device in the cluster 2 may be the device E. The execution process of the task flow in cluster 2 is similar and is not discussed in detail here.

Example Method

Figure 8:
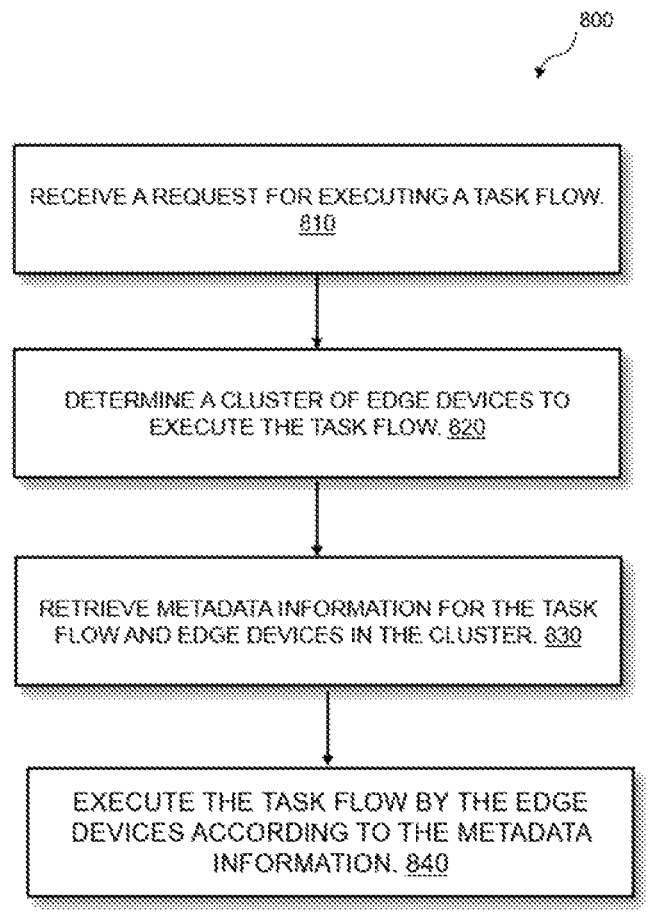
FIG. 8 illustrates a flowchart of an exemplary method 800 for dynamically managing the task flow in the edge computing environment according to some embodiments of the present disclosure.

FIG. 8 shows a flowchart of an example method 800 in accordance with some embodiments of the present disclosure. The method 800 can be implemented in the edge computing environment as shown in FIG. 5. For the purpose of discussion, the method 800 will be described with reference to FIG. 5.

At 810, the definer module 5231 receives a request for executing a task flow. At 820, the definer module 5231 determines a cluster of edge devices to execute the task flow from a set of edge devices. At 830, the definer module 5231 retrieves metadata information for the task flow and edge devices in the cluster, wherein the metadata information is used to schedule the task flow in the cluster. At 840, the edge devices in the cluster execute the task flow according to the metadata information.

According to one embodiment of the present disclosure, the definer module may determine a cluster of edge devices to execute the task flow from a set of edge devices, which comprises: the definer module retrieving attributes of the task flow and a set of edge devices respectively; selecting a group of edge devices from the set of edge devices as a cluster of edge devices to execute the task flow based on a mapping relationship of the attributes between the task flow and the set of edge devices.

According to one embodiment of the present disclosure, the definer module may determine a cluster of edge devices to execute the task flow from a set of edge devices, which further comprises: the definer module selecting one edge device from the edge devices in the cluster as a coordinator device to manage the status of other edge devices in the cluster; the definer module indicating the information of the coordinator device in the metadata information.

According to one embodiment of the present disclosure, the edge devices in the cluster may execute the task flow according to the metadata information, which comprises: a sending module sending a request for executing the task flow with the metadata information to one or more starting edge devices in the cluster, wherein the task flow comprises a series of subtasks and the one or more starting edge devices are corresponding to one or more starting subtasks according to the metadata information; a corresponding edge device in the cluster running the corresponding subtask according to the metadata information; in response to one or more last subtasks being completed by one or more last edge devices, the one or more last edge devices sending one or more final running results to a receiver module.

According to one embodiment of the present disclosure, the edge devices in the cluster may execute the task flow according to the metadata information, which comprises: a sending module sending a request for executing the task flow with the metadata information to one or more starting edge devices in the cluster, wherein the task flow comprises a series of subtasks and the one or more starting edge devices correspond to one or more starting subtasks according to the metadata information; a corresponding edge device in the cluster running the corresponding subtask according to the metadata information; in response to one or more last subtasks being completed by one or more last edge devices, the one or more last edge devices sending one or more final running results to a receiver module; the coordinator device obtaining status information of other edge devices in the cluster; and sending the status information to the receiver module.

According to one embodiment of the present disclosure, sending a request for executing the task flow with the metadata information to one or more starting edge devices in the cluster comprises: a sending module sending a request for executing the task flow with the metadata information in the header of the request to one or more starting edge devices in the cluster.

According to one embodiment of the present disclosure, wherein the metadata information may indicate at least one of following: an ID of the task flow, an ID of the cluster, IDs of the edge devices involved in the cluster, IDs of the subtasks of the task flow to be executed by the edge devices in the cluster, and an ID of the coordinator device.

According to one embodiment of the present disclosure, the metadata information of the cluster of edge devices to execute the task flow may be stored in the store module.

It should be noted that the processing of the task flow according to embodiments of this disclosure could be implemented by the computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a definer module, a request for executing a task flow;
   determining, by the definer module, a cluster of edge devices to execute the task flow from a set of edge devices, wherein determining the cluster of edge devices to execute the task flow from the set of edge devices comprises:
      retrieving, by the definer module, attributes of the task flow and the set of edge devices respectively; and
      selecting a group of edge devices from the set of edge devices as the cluster of edge devices to execute the task flow based on a mapping relationship of the attributes between the task flow and the set of edge devices;
   retrieving, by the definer module, metadata information for the task flow and the edge devices in the cluster, wherein the metadata information is used to schedule the task flow in the cluster; and
   executing, by the edge devices in the cluster, the task flow according to the metadata information, wherein executing the task flow according to the metadata information comprises:
      sending, by a sending module, a request for executing the task flow with the metadata information to one or more starting edge devices in the cluster, wherein the task flow comprises a series of subtasks and the one or more starting edge devices correspond to one or more starting subtasks according to the metadata information;
      running, by a corresponding edge device in the cluster, the corresponding subtask according to the metadata information; and
      in response to one or more last subtasks being completed by one or more last edge devices, sending, by the one or more last edge devices, one or more final running results to a receiver module;
   selecting, by the definer module, one edge device from the edge devices in the cluster as a coordinator device to manage a status of other edge devices in the cluster; and
   indicating, by the definer module, the information of the coordinator device in the metadata information.

2. The method of claim 1, wherein executing the task flow according to the metadata information comprises:
   sending, by a sending module, a request for executing the task flow with the metadata information to one or more starting edge devices in the cluster, wherein the task flow comprises a series of subtasks and the one or more starting edge devices correspond to one or more starting subtasks according to the metadata information;
   running, by a corresponding edge device in the cluster, the corresponding subtask according to the metadata information;
   in response to one or more last subtasks being completed by one or more last edge devices, sending, by the one or more last edge devices, one or more final running results to a receiver module;
   obtaining, by the coordinator device, status information of the other edge devices in the cluster; and
   sending, by the coordinator device, the status information to the receiver module.

3. The method of claim 1, wherein sending the request for executing the task flow with the metadata information to the one or more starting edge devices in the cluster comprises:
   sending, by the sending module, the request for executing the task flow with the metadata information in a header of the request to the one or more starting edge devices in the cluster.

4. The method of claim 1, wherein the metadata information is selected from a group consisting of at least one of an ID of the task flow, an ID of the cluster, IDs of the edge devices involved in the cluster, IDs of subtasks of the task flow to be executed by the edge devices in the cluster, or an ID of a coordinator device.

5. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving, by a definer module, a request for executing a task flow;
   determining, by the definer module, a cluster of edge devices to execute the task flow from a set of edge devices, wherein determining the cluster of edge devices to execute the task flow from the set of edge devices comprises:
      retrieving, by the definer module, attributes of the task flow and the set of edge devices respectively; and
      selecting a group of edge devices from the set of edge devices as the cluster of edge devices to execute the task flow based on a mapping relationship of the attributes between the task flow and the set of edge devices;
   retrieving, by the definer module, metadata information for the task flow and the edge devices in the cluster, wherein the metadata information is used to schedule the task flow in the cluster;
   executing, by the edge devices in the cluster, the task flow according to the metadata information, wherein executing the task flow according to the metadata information comprises:
      sending, by a sending module, a request for executing the task flow with the metadata information to one or more starting edge devices in the cluster, wherein the task flow comprises a series of subtasks and the one or more starting edge devices correspond to one or more starting subtasks according to the metadata information;

running, by a corresponding edge device in the cluster, the corresponding subtask according to the metadata information; and in response to one or more last subtasks being completed by one or more last edge devices, sending, by the one or more last edge devices, one or more final running results to a receiver module;

selecting, by the definer module, one edge device from the edge devices in the cluster as a coordinator device to manage a status of other edge devices in the cluster; and indicating, by the definer module, the information of the coordinator device in the metadata information.

6. The computer system of claim 5, wherein executing the task flow according to the metadata information comprises:

sending, by a sending module, a request for executing the task flow with the metadata information to one or more starting edge devices in the cluster, wherein the task flow comprises a series of subtasks and the one or more starting edge devices correspond to one or more starting subtasks according to the metadata information;

running, by a corresponding edge device in the cluster, the corresponding subtask according to the metadata information;

in response to one or more last subtasks being completed by one or more last edge devices, sending, by the one or more last edge devices, one or more final running results to a receiver module;

obtaining, by the coordinator device, status information of the other edge devices in the cluster; and sending, by the coordinator device, the status information to the receiver module.

7. The computer system of claim 5, wherein sending the request for executing the task flow with the metadata information to the one or more starting edge devices in the cluster comprises:

sending, by the sending module, the request for executing the task flow with the metadata information in a header of the request to the one or more starting edge devices in the cluster.

8. The computer system of claim 5, wherein the metadata information is selected from a group consisting of at least one of an ID of the task flow, an ID of the cluster, IDs of the edge devices involved in the cluster, IDs of subtasks of the task flow to be executed by the edge devices in the cluster, or an ID of a coordinator device.

9. A computer program product, the computer program product comprising:

one or more computer-readable storage medium and program instructions stored on at least one of the one or more storage medium, the program instructions executable by a processor capable of performing a method, the method comprising:

receiving, by a definer module, a request for executing a task flow;

determining, by the definer module, a cluster of edge devices to execute the task flow from a set of edge devices, wherein determining the cluster of edge devices to execute the task flow from the set of edge devices comprises:

retrieving, by the definer module, attributes of the task flow and the set of edge devices respectively; and selecting a group of edge devices from the set of edge devices as the cluster of edge devices to execute the task flow based on a mapping relationship of the attributes between the task flow and the set of edge devices;

retrieving, by the definer module, metadata information for the task flow and the edge devices in the cluster, wherein the metadata information is used to schedule the task flow in the cluster; and executing, by the edge devices in the cluster, the task flow according to the metadata information, wherein executing the task flow according to the metadata information comprises:

sending, by a sending module, a request for executing the task flow with the metadata information to one or more starting edge devices in the cluster, wherein the task flow comprises a series of subtasks and the one or more starting edge devices correspond to one or more starting subtasks according to the metadata information;

running, by a corresponding edge device in the cluster, the corresponding subtask according to the metadata information; and in response to one or more last subtasks being completed by one or more last edge devices, sending, by the one or more last edge devices, one or more final running results to a receiver module;

selecting, by the definer module, one edge device from the edge devices in the cluster as a coordinator device to manage a status of other edge devices in the cluster; and indicating, by the definer module, the information of the coordinator device in the metadata information.

10. The computer program product of claim 9, wherein executing the task flow according to the metadata information comprises:

sending, by a sending module, a request for executing the task flow with the metadata information to one or more starting edge devices in the cluster, wherein the task flow comprises a series of subtasks and the one or more starting edge devices correspond to one or more starting subtasks according to the metadata information;

running, by a corresponding edge device in the cluster, the corresponding subtask according to the metadata information;

in response to one or more last subtasks being completed by one or more last edge devices, sending, by the one or more last edge devices, one or more final running results to a receiver module;

obtaining, by the coordinator device, status information of the other edge devices in the cluster; and sending, by the coordinator device, the status information to the receiver module.

11. The computer program product of claim 9, wherein sending the request for executing the task flow with the metadata information to the one or more starting edge devices in the cluster comprises:

sending, by the sending module, the request for executing the task flow with the metadata information in a header of the request to the one or more starting edge devices in the cluster.

* * * * *